United States Patent [19]
Jorgensen et al.

[11] Patent Number: 5,286,385
[45] Date of Patent: Feb. 15, 1994

[54] METHOD FOR REMOVING NITROGEN FROM AN AQUEOUS SOLUTION

[75] Inventors: Svend E. Jorgensen, Langk r V nge 9, DK-3500 V rlose; Bent Halling-Sorensen, Amager F lledvej 9, 5.th., DK-2300 Kobenhavn S; Henning Hjuler, Aajev 6, DK-2990 Nivaa; Karsten Poulsen, Aars, all of Denmark

[73] Assignees: Svend Erik Jørgensen; Bent Halling-Sørensen; Henning Hjuler, all of Denmark

[21] Appl. No.: 969,265

[22] PCT Filed: Apr. 25, 1991

[86] PCT No.: PCT/DK91/00111
§ 371 Date: Jan. 6, 1993
§ 102(e) Date: Jan. 6, 1993

[87] PCT Pub. No.: WO9/17123
PCT Pub. Date: Nov. 14, 1991

[30] Foreign Application Priority Data
May 7, 1990 [DK] Denmark .............................. 1125/90

[51] Int. Cl.⁵ .............................................. C02F 3/30
[52] U.S. Cl. .................................. 210/610; 210/617; 210/669; 210/903
[58] Field of Search ................. 210/610, 611, 614–619, 210/631, 681, 903, 663, 669

[56] References Cited

U.S. PATENT DOCUMENTS

| | | | |
|---|---|---|---|
| 4,370,234 | 1/1983 | Marsland | 210/617 |
| 4,719,061 | 12/1988 | Sumino et al. | 435/178 |
| 4,722,848 | 2/1988 | Paoletti et al. | 424/89 |
| 4,871,671 | 10/1989 | Errede et al. | 435/182 |
| 5,188,737 | 2/1993 | Sato et al. | 210/903 |

FOREIGN PATENT DOCUMENTS

| | | |
|---|---|---|
| 6385/87 | 4/1988 | Denmark . |
| 0160/90 | 1/1990 | Denmark . |
| 0173340 | 3/1986 | European Pat. Off. . |
| 0306053 | 9/1988 | European Pat. Off. . |
| 3520160 | 12/1986 | Fed. Rep. of Germany . |
| 3639153 | 5/1988 | Fed. Rep. of Germany . |
| 3724027 | 2/1989 | Fed. Rep. of Germany . |
| 3810564 | 10/1989 | Fed. Rep. of Germany . |
| 1584373 | 2/1981 | United Kingdom . |

*Primary Examiner*—Thomas Wyse
*Attorney, Agent, or Firm*—Watson, Cole, Grindle & Watson

[57] ABSTRACT

A method of removing nitrogen from an aqueous solution by simultaneous microbial nitrification and dentrification comprising treating the aqueous solution in one or more fixed bed reactors containing a porous carrier material having nitrifying and denitrifying microorganisms fixed thereto, and using an ammonium selective ion exchanger as carrier material.

17 Claims, 2 Drawing Sheets

METHOD FOR REMOVING NITROGEN FROM AN AQUEOUS SOLUTION

The present invention relates to a method for removing nitrogen from an aqueous solution, such as waste water and drinking water, by simultaneous microbial nitrification and denitrification comprising treating the aqueous solution in one or more fixed bed reactors containing a porous carrier material having nitrifying and denitrifying microorganisms fixed thereto.

Nitrification is usually effected by aerobic autotrophs in a two-step reaction. Firstly, ammonium is converted to nitrite by e.g. Nitrosomonas, and then nitrite is converted to nitrate by e.g. Nitrobacter. The overall reaction may be represented as follows:

$$NH_3 + CO_2 + O_2 + bacteria \rightarrow NO_3 + new\ bacteria$$

Denitrication is effected by facultative heterotrophs under anoxic condition and using organic carbon as electron donor. As a result of the denitrification, nitrate ions are reduced to free nitrogen, which is liberated in gaseous form. The denitrification may be represented as follows:

$$NO_3 + organic\ matter + bacteria \rightarrow N_2\ (gas) + new\ bacteria$$

As will appear from the above, nitrification and denitrification take place under different physical conditions. However, when a porous carrier material is used, nitrification and denitrification, i.e. the conversion of ammonium to gaseous nitrogen, can be carried out simultaneously in one reactor. Thus, by using a porous carrier material, it is possible to establish anoxic conditions in the interior of the pores and aerobic conditions at the surface of the carrier material.

DE patent publication No. 38 10 564 A1 discloses a carrier material for fixing microorganisms, particularly nitrifying and denitrifying microorganisms, said carrier material being made up by a mixture of pumice and clay having a pore size of from 0.05 to 0.5 mm.

DE patent publication No. 36 39 153 A1 discloses a carrier material for use in different types of bioreactors, which carrier material consists of porous, inorganic beads of sinter.

The prior art carrier material may be used for removing nitrogen from waste water.

DK patent application No. 160/90 discloses a method of nitrification and removal of nitrogen using nitrifying bacteria, which method comprises immobilizing the bacteria on a porous carrier material, such as activated carbon, zeolite, ceramics and ion exchangers.

JP patent application no. 85/58228 discloses pellets of calcium alginate gel containing clinoptilolite and immobilized nitrateforming bacteria and nitrifying bacteria. The pellets may be used in connection with lake water purification.

In the process of simultaneous nitrification and denitrification, the overall nitrogen removal is usually limited by the nitrification reaction, which is believed to be due to the fact that the specific reaction rate of the nitrification reaction is much lower than that of the denitrification reaction.

Furthermore, the growth rate of nitrifying bacteria is lower than that of denitrifying bacteria, and accordingly in a heterogenous culture containing both nitrifying and denitrifying bacteria, there is a risk that the denitrifying bacteria will propagate at the expense of the nitrifying bacteria, thus resulting in a reduction of the total amount of nitrifying bacteria and hence the total nitrification rate.

The object of the present invention is to provide a more efficient and a more reliable method for removing nitrogen from an aqueous solution.

The method of the invention is characterized in that an ammonium selective ion exchanger is used as carrier material.

The invention is based on the discovery that by using an armnonium selective ion exchanger as carrier material an extremely high nitrogen removal rate can be achieved.

It is believed that the high removal rate achieved by the method of the invention is the result of an increased transport of ammonium across the biofilm as explained in the following.

The nitrifying and denitrifying bacteria are contained in a biofilm covering the carrier material, the nitrifying bacteria being positioned in the outer layer of said biofilm and the denitrifying bacteria being positioned in the inner layer thereof.

The transport of ammonium across the biofilm is dependent on the magnitude of the ammonium concentration gradient across the biofilm.

When an ammonium selective ion exchanger is used as carrier material, part of the ammonium molecules crossing the biofilm will be absorbed onto the ion exchanger, and part of the absorbed ammonium molecules will continuously be desorbed from the ion exchanger and taken up by the nitrifying bacteria.

The ammonium molecules absorbed on the ion exchanger, which molecules are being replaced continuously by new ammonium molecules, do not have any influence on the concentration gradient across the biofilm, i.e. the transport driving force, the result being an increased overall ammonium transport across the biofilm.

A further advantage of the method of the invention is that when the method is being used for removing nitrogen from aqueous solutions containing both ammonium and nitrate, which is the case with many types of waste water, the above discussed increased ammonium transport across the biofilm will result in an increased transport of nitrate as well, the oppositely charged ionic molecules acting as counter ions during the transport.

The ammonium selective ion exchanger used in the method of the invention is preferably macroporous. By using a macroporous carrier a high nitrogen removal per unit of reactor volume and per unit of time can be achieved. This is i.a. due to the fact 1) that a macroporous carrier material provide a large surface area for the fixing of microorganisms and thus a high concentration of microorganisms, and 2) that the nitrification and denitrification take place within micrometers from each other, thus reducing the time of transport of the nitrate between the site of nitrification and the site of denitrification to a minimum.

Examples of suitable ammonium selective ion exchanger are clinoptilolite, phillipsite, mordenite and irionite.

Preferably, activated clinoptilolite is used as carrier material. Clinoptilolite is activated by replacing the potassium ions of the natural clinoptilolite with sodium ions, the latter having a high potential for being exchanged for ammonium ions.

A preferred embodiment of the method of the invention is characterized in that the ammonium selective ion exchanger is inoculated with nitrifying microorganisms, which are allowed to propagate before the supply of the aqueous solution to the reactor is initiated.

The ion exchanger is inoculated with nitrifying microorganisms in order to ensure a high starting concentration of said microorganisms and hence a high concentration of the microorganisms during the subsequent purification process.

When the ammonium selective ion exchanger is inoculated with nitrifying microorganisms, the propagation of the inoculum of nitrifying microorganisms is preferably carried out in a buffer solution, e.g. a phosphate buffer solution, in order to prevent a lowering of the ph-value of the solution surrounding the microorganisms, such a lowering having an adverse effect on the growth of the microorganisms.

In another preferred embodiment of the invention, the ratio of carbon to nitrogen in the aqueous solution supplied to the fixed bed reactor is controlled in order to control the relative growth of nitrifying and denitrifying microorganisms so as to secure that a high concentration of nitrifying microorganisms is maintained at all times. The ratio of carbon to nitrogen (C:N) in the aqueous solution supplied to the fixed bed reactor is preferably from about 1.0 to about 6.0, more preferably from about 3.0 to about 5.0.

A further preferred embodiment of the invention is characterized in that subsequent to the propagation of the inoculum of nitrifying microorganisms, the ion exchanger is inoculated with denitrifying microorganisms, e.g. in the form of activated sludge containing denitrifying microorganisms, which are allowed to propagate before the supply of the aqueous solution is initiated.

Still another embodiment of the method of the invention, whereby carbonaceous matter is removed from the aqueous solution, is characterized in that prior to the treatment in the fixed bed reactor using an ammonium selective ion exchanger as carrier material, the aqueous solution is treated in a separate fixed bed reactor containing a carrier material having microorganisms capable of decomposing carbonaceous matter fixed thereto.

When carbonaceous matter is to be removed from the aqueous solution, a bark ion exchanger is preferably used as carrier material in the separate fixed bed reactor. Such a bark ion exchanger is particularly suitable for holding bacteria capable of decomposing carbonaceous matter and hence for obtaining removal of carbonaceous matter.

When carbonaceous matter is to be removed from the aqueous solution, the method of the invention is preferably carried out so that the carrier material in the separate fixed bed reactor is inoculated with microorganisms capable of decomposing carbonaceous matter, e.g. in the form of activated sludge containing said microorganisms, which microorganisms are allowed to propagate before the supply of the aqueous solution is initiated.

Preferably, the fixed bed reactor used in the method of the invention is an upflow column.

Alternatively, the fixed bed reactor used in the method of the invention may be a reactor having a progressively diminishing cross-sectional area in the flow direction of the aqueous solution.

In a reactor of this type, the flow rate of the aqueous solution will increase through the column, and hence the hydraulic retention time will decrease through the reactor.

Such a reactor can e.g. have the form of a box-shaped tank divided into two compartments by an inclined wall so as to form two compartments having different volumes, the larger compartment having a larger bottom area than the smaller compartment and the two compartments having top areas of substantially equal sizes.

The above described reactor operates as follows:

The aqueous solution is supplied to the bottom of the larger compartment under pressure and pumped up through said compartment to the top thereof, from where it is carried to the top of the adjacent smaller compartment and allowed to pass down through the smaller compartment, from the bottom of which the purified aqueous solution is collected.

In a traditional upflow column, the flow rate of aqueous solution is constant through the column, and thus the amount of nitrogen supplied to a given point in the column per unit of time, which amount in the following will be referred to as the nitrogen loading, will decrease rapidly through the column as more and more nitrogen is being removed from the aqueous solution supplied to the bottom of the column. Thus, in a traditional upflow column, the nitrogen removal rate, i.e. the nitrogen removal per unit of reactor volume and per unit of time, will decrease up through the column.

By using a reactor having a progressively diminishing cross-sectional area, the decrease of the nitrogen loading in the flow direction of the aqueous solution can be reduced and thus, the efficiency of the reactor can be improved.

The ammonium ion selectivity of a ion exchanger may be determined using the following test:

A suitable amount of ion exchanger is contacted with an excess amount of an aqueous solution containing ammonium ions in a concentration of 0.1M and sodium ions in a concentration of 0.1M. The mixture of ion exchanger and solution is stirred, e.g. by shaking.

Then, the solution is separated from the ion exchanger, and the amount of ammonium ions and sodium ions, which have been absorbed to the ion exchanger are determined, e.g. by determining the amount of ammonium ions and sodium ion removed from the separated solution.

In connection with the present invention, "ammonium ion selectivity relative to sodium ions" is defined as the ratio of the amount of ammonium ions absorbed to the ion exchanger to the amount of sodium ions absorbed to the ion exchanger ($NH_4^+/Na^+$) when applying the above described test.

In connection with the present invention, the term "ammonium selective ion exchanger" is to be understood as meaning any ion exchanger having an ammonium ion selectivity relative to sodium ions of above 1.0, preferably above 1.5, more preferably above 2.0, still more preferably above 2.5 and most preferably above 5.0.

In the following, the present invention will be described in further detail with reference to the example below.

EXAMPLE

An aqueous solution containing from 30 to 1000 mg nitrogen per liter, in the form of ammonium and from 0.1 to 0.70 mg nitrogen per liter in the form of nitrate was purified using the method of the invention.

The nitrogeneous aqueous solution was prepared to simulate different types of waste water. The ammonium of the aqueous solution was added in the form of ammonium chloride. The organic carbon source required in the denitrification was added in the form of stoichiometric amounts of ethanol.

Activated clinoptilolite having a grain size of from 2.0 to 4.0 mm and montmorillonite (40% ammonium selective relative to activated clinoptilolite) were used as carrier materials, and for comparison purposes also Leca ® (0% ammonium selective) was used.

The carrier material was packed in a tubular container of plexiglass and having an inner diameter of 200 mm and a height of 1.10 m. The fixed bed reactor had a bed volume of about 28 liters and a void volume of about 8 liters. The reactor was aerated in upflow direction so as to obtain a concentration of dissolved oxygen of between 2 and 3 mg/l (aerobic conditions).

The temperature of the reactor was 20° C. at all times, and the pH-value of the reactor was maintained at a level of from 7.7 to 7.8.

The inoculation of the reactor with nitrifying bacteria was carried out as follows. The nitrifying bacteria was propagated in a concentrated nutrient solution (TGY-medium) to obtain a cell concentration of about $10^9$ cells per liter. The propagated cells were then added to a solution containing 30 mg nitrogen in the form of ammonium per liter and 230 mg ethanol per liter.

The resulting solution was then supplied to the fixed bed reactor, which contained a phosphate buffer solution having a ph-value of 6.8. The bacteria was then allowed to propagate for a period of 2 to 3 days, during which the mixture of the supplied solution and the buffer solution was circulated and during which ammonium was continuously being added to the reactor to maintain a suitable concentration of ammonium at all times.

Subsequent to the propagation of nitrifying bacteria, the reactor was inoculated with sludge containing denitrifying bacteria, which was then allowed to propagate before the supply of the nitrogeneous aqueous solution to be purified was initiated.

In Tables 1, 2 and 3 the results obtained are listed for activated clinoptilolite, montmorillonite and Lecal ®, respectively.

Figure 1:
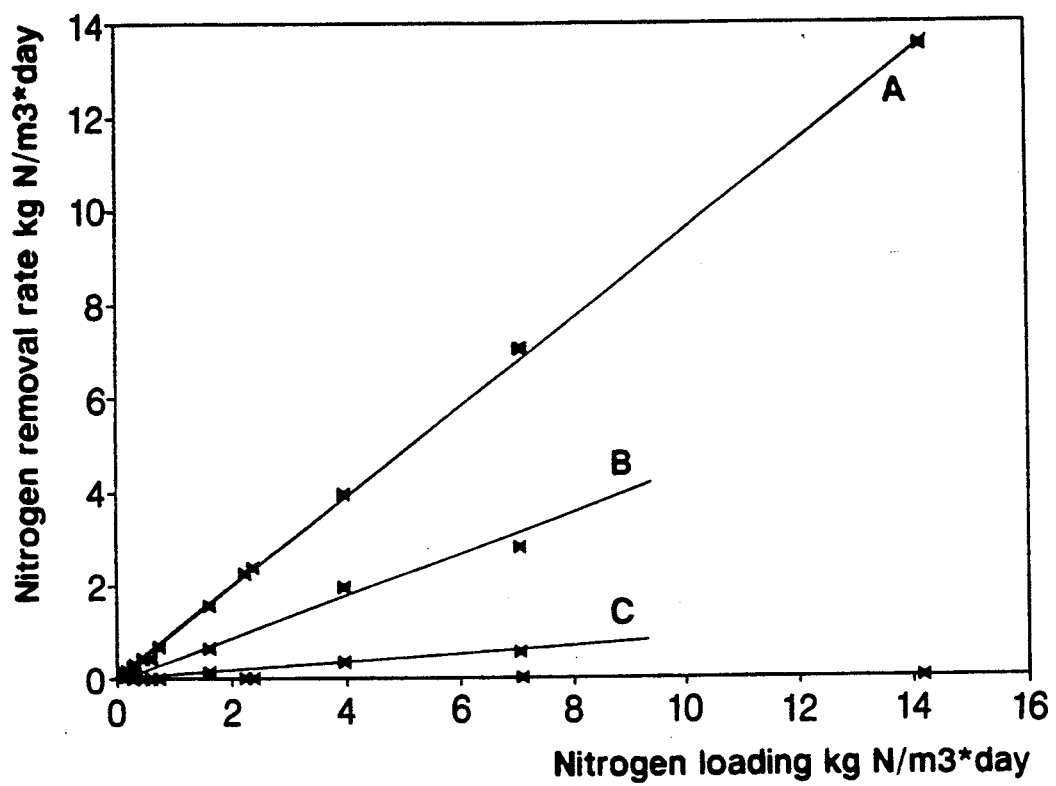
FIG. 1 shows the results listed in Tables 1, 2 and 3 (curve A, B and C, respectively) in an (X=Nitrogen loading; Y=Nitrogen removal rate)-diagram.

As will appear from Tables 1, 2 and 3 and from FIG. 1, the performance of the two methods using ammonium selective ion exchangers as carrier material are highly superior to the method using a carrier material having no ammonium selectivity.

Furthermore, it will appear that the method using activated clinoptilolite is highly superior to the method using montmorillonite.

In the method using activated clinoptilolite, the efficiency obtained, i.e. the ratio of nitrogen removed to nitrogen supplied, is very high even at very high nitrogen loadings. As will appear from FIG. 1, the efficiency do not show any sign of decrease within the nitrogen loading interval tested, i.e. up to 14,118 kg nitrogen per m$^3$ reactor volume per day.

TABLE 1

| | | Carrier Material: Clinoptilolite | | | | | | |
|---|---|---|---|---|---|---|---|---|
| | Nitrogen loading | Nitrogen in the form of ammonium | | | Nitrogen in the form of nitrate | | Nitrogen removal rate | |
| Flow l/h | kg N/m$^3$·day | Influent mg/l | Effluent mg/l | Efficiency % | Influent mg/l | Effluent mg/l | kg N/m$^3$·day | Efficiency % |
| 1.2 | 0.108 | 30.0 | 1.49 | 95.0 | 0.10 | 1.30 | 0.098 | 90.7 |
| 2.0 | 0.178 | 30.0 | 0.22 | 99.3 | 0.10 | 2.12 | 0.165 | 92.7 |
| 3.6 | 0.324 | 30.0 | 0.51 | 98.3 | 0.20 | 0.22 | 0.319 | 98.5 |
| 0.9 | 0.270 | 100.0 | 1.44 | 98.6 | 0.40 | 4.63 | 0.255 | 94.4 |
| 1.5 | 0.450 | 100.0 | 1.61 | 98.4 | 0.10 | 3.95 | 0.425 | 94.4 |
| 2.0 | 0.585 | 100.0 | 0.70 | 99.3 | 0.70 | 29.70 | 0.412 | 70.4 |
| 2.5 | 0.738 | 100.0 | 1.38 | 98.6 | 0.10 | 6.25 | 0.683 | 92.5 |
| 5.3 | 1.600 | 100.0 | 1.96 | 98.0 | 0.40 | 1.65 | 1.550 | 96.9 |
| 1.5 | 2.250 | 500.0 | 0.67 | 99.9 | 0.46 | 0.49 | 2.248 | 99.9 |
| 2.6 | 3.960 | 500.0 | 0.71 | 99.9 | 0.42 | 0.30 | 3.956 | 99.9 |
| 4.7 | 7.059 | 500.0 | 0.72 | 99.9 | 0.70 | 0.23 | 7.055 | 99.9 |
| 0.8 | 2.392 | 1000.0 | 2.23 | 99.8 | 0.12 | 1.97 | 2.383 | 99.6 |
| 2.4 | 7.100 | 1000.0 | 5.51 | 99.4 | 0.26 | 0.66 | 7.059 | 99.4 |
| 4.7 | 14.118 | 1000.0 | 42.3 | 95.8 | 0.35 | 0.70 | 13.516 | 95.7 |

TABLE 2

| | | Carrier Material: Montmorillonite | | | | | | |
|---|---|---|---|---|---|---|---|---|
| | Nitrogen loading | Nitrogen in the form of ammonium | | | Nitrogen in the form of nitrate | | Nitrogen removal rate | |
| Flow l/h | kg N/m$^3$·day | Influent mg/l | Effluent mg/l | Efficiency % | Influent mg/l | Effluent mg/l | kg N/m$^3$·day | Efficiency % |
| 1.2 | 0.108 | 30.0 | 12.5 | 58.3 | 0.10 | 2.50 | 0.054 | 50.0 |
| 2.0 | 0.178 | 30.0 | 13.1 | 41.7 | 0.10 | 4.10 | 0.077 | 43.4 |
| 3.6 | 0.324 | 30.0 | 15.0 | 34.6 | 0.20 | 3.00 | 0.132 | 40.7 |
| 5.3 | 1.600 | 100.0 | 51.9 | 49.1 | 0.40 | 4.70 | 0.657 | 41.1 |
| 2.6 | 3.960 | 500.0 | 251.0 | 50.2 | 0.42 | 4.80 | 1.937 | 48.9 |
| 4.7 | 7.059 | 500.0 | 299.1 | 29.8 | 0.70 | 1.23 | 2.829 | 40.1 |

TABLE 3

| | | Carrier Material: Leca ® | | | | | | |
|---|---|---|---|---|---|---|---|---|
| | Nitrogen loading | Nitrogen in the form of ammonium | | | Nitrogen in the form of nitrate | | Nitrogen removal rate | |
| Flow l/h | kg N/m³·day | Influent mg/l | Effluent mg/l | Efficiency % | Influent mg/l | Effluent mg/l | kg N/m³·day | Efficiency % |
| 1.2 | 0.108 | 30.0 | 27.0 | 10.0 | 0.20 | 1.20 | 0.007 | 6.6 |
| 2.0 | 0.178 | 30.0 | 27.2 | 9.4 | 0.10 | 0.40 | 0.015 | 8.3 |
| 3.6 | 0.324 | 30.0 | 27.8 | 7.3 | 0.15 | 0.50 | 0.020 | 6.2 |
| 5.3 | 1.600 | 100.0 | 91.9 | 8.1 | 0.30 | 0.40 | 0.128 | 8.0 |
| 2.6 | 3.960 | 500.0 | 455.0 | 9.0 | 0.40 | 0.60 | 0.354 | 9.0 |
| 4.7 | 7.059 | 500.0 | 460.0 | 8.0 | 0.10 | 0.70 | 0.556 | 7.9 |

Figure 2:
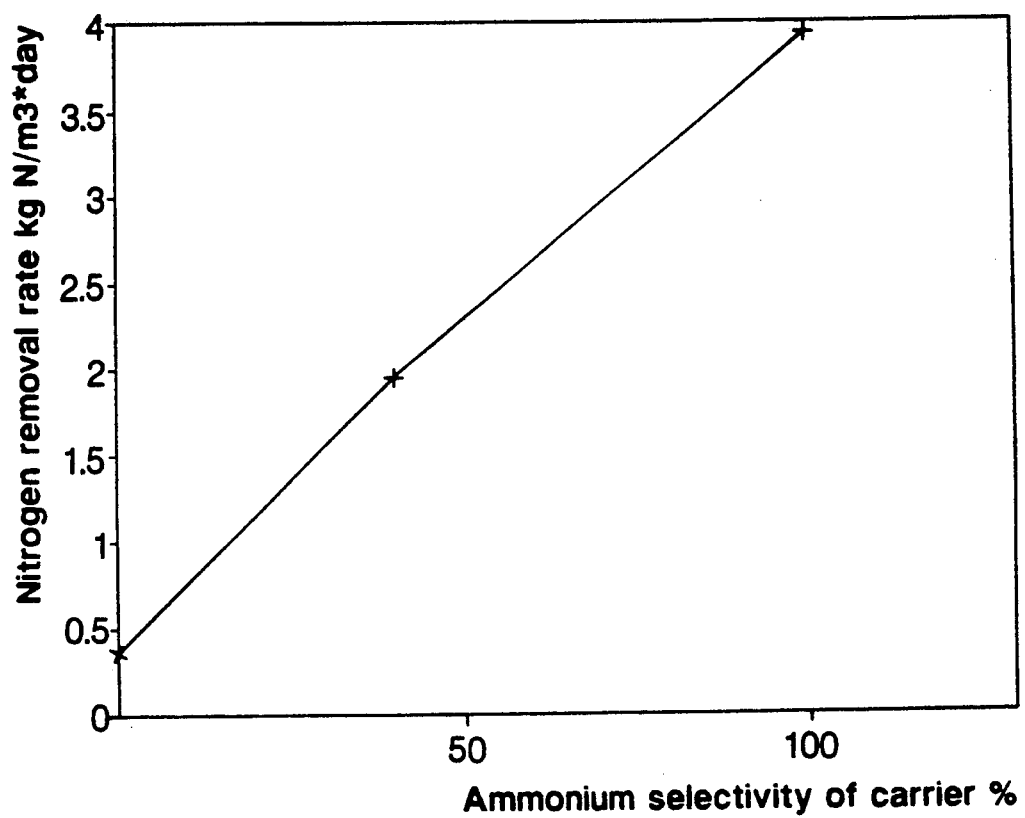
FIG. 2 shows the nitrogen removal rate at a nitrogen loading of 3.960 kg N/m$^3$·day (Y) plotted against the degree of ammonium selectively of the carrier material (X).

As will appear from FIG. 2, the nitrogen removal rate obtained appear to be linearly dependent on the degree of ammonium selectively of the carrier material.

We claim:

1. A method of removing nitrogen from an aqueous solution by simultaneous microbial nitrification and denitrification comprising treating the aqueous solution in one or more fixed bed reactors containing a porous material having nitrifying and denitrifying microorganisms fixed thereto, said carrier material consisting of an ammonium selective ion exchanger.

2. A method according to claim 1, wherein said ion exchanger has an ammonium ion selectively relative to sodium ions of above 1.0.

3. A method according to claim 1, wherein said ion exchanger is a microporous ammonium selective ion exchanger.

4. A method according to claim 1, wherein said carrier material is selected from the group consisting of clinoptilolite, phillipsite, mordenite and orionite.

5. A method according to claim 4, wherein said carrier material is activated clinoptilolite.

6. A method according to claim 1, wherein said ammonium selective ion exchanger is inoculated with nitrifying microorganisms, which are allowed to propagate before the supply of the aqueous solution to the reactor is initiated.

7. A method according to claim 6, wherein that the propagation of the inoculum of nitrifying microorganisms is carried out in a buffer solution.

8. A method according to claim 1, including the step of controlling the ratio of carbon to nitrogen in the aqueous solution supplied to the fixed bed reactor.

9. A method according to claim 8, wherein that the ratio of carbon to nitrogen is from about 1.0 to about 6.0.

10. A method according to claim 8, wherein that the ratio of carbon to nitrogen is from about 3.0 to about 5.0.

11. A method according to claim 1, wherein subsequent to the propagation of the inoculum of nitrifying microorganisms, the ion exchanger is inoculated with denitrifying microorganisms, which are allowed to propagate before the supply of the aqueous solution is initiated.

12. A method according to claim 1, whereby carbonaceous matter is removed from the aqueous solution, and wherein prior to the treatment in the fixed bed reactor using an ammonium selective ion exchanger as carrier material, the aqueous solution is treated in a separate fixed bed reactor containing a carrier material having microorganisms capable of decomposing carbonaceous matter fixed thereto.

13. A method according to claim 12, wherein said carrier material in the separate fixed bed reactor is a bark ion exchanger.

14. A method according to claim 12 wherein that the carrier material in the separate fixed bed reactor is inoculated with microorganisms capable of decomposing carbonaceous matter, which microorganisms are allowed to propagate before the supply of the aqueous solution is initiated.

15. A method according to claim 12, wherein said fixed bed reactor is an upflow column.

16. A method according to claim 12, wherein said fixed bed reactor has a progressively diminishing cross-sectional area in the flow direction of the aqueous solution.

17. A method according to claim 16, wherein said fixed bed reactor has the form of a box-shaped tank divided into two compartments by an inclined wall.

* * * * *